United States Patent [19]
Schilling et al.

[11] Patent Number: 5,596,032
[45] Date of Patent: Jan. 21, 1997

[54] SLOW-SETTING BITUMINOUS EMULSIONS

[75] Inventors: Peter Schilling, Charleston; Fredricke S. Starr, Johns Island, both of S.C.

[73] Assignee: Westvaco Corporation, New York, N.Y.

[21] Appl. No.: 249,366

[22] Filed: May 27, 1994

[51] Int. Cl.$^6$ .................... C08L 95/00; B01J 13/00
[52] U.S. Cl. ................ 524/60; 106/277; 252/311.5; 252/356
[58] Field of Search ................ 252/311.5, 356; 106/277; 524/60; 530/214, 218, 502, 504; 527/400

[56] References Cited

U.S. PATENT DOCUMENTS

| | | | |
|---|---|---|---|
| 2,324,473 | 7/1943 | Allinson | 252/311.5 |
| 2,615,819 | 10/1952 | Manzer | 106/277 |
| 2,743,288 | 4/1956 | Rueggeberg et al. | 554/96 |
| 3,412,056 | 11/1968 | Crawford et al. | 524/600 |
| 3,451,958 | 6/1969 | Riedeman et al. | 524/114 |
| 3,753,968 | 8/1973 | Ward | 562/509 |
| 3,899,476 | 8/1975 | Ward | 562/509 |
| 4,017,474 | 4/1977 | Glasser et al. | 527/400 |
| 4,018,730 | 4/1977 | McDonald | 524/60 |
| 4,081,462 | 3/1978 | Powers et al. | 562/509 |
| 4,462,840 | 7/1984 | Schilling et al. | 106/277 |
| 4,478,642 | 10/1984 | Schilling et al. | 106/277 |
| 4,547,224 | 10/1985 | Schilling | 106/277 X |
| 4,657,595 | 4/1987 | Russell | 106/277 |
| 4,676,927 | 6/1987 | Schilling et al. | 252/311.5 |
| 4,859,245 | 8/1989 | Schilling et al. | 106/277 |
| 4,990,591 | 2/1991 | Schilling | 252/311.5 X |
| 5,266,682 | 11/1993 | Uhrig et al. | 530/218 X |
| 5,336,438 | 8/1994 | Schilling et al. | 252/311.5 |

FOREIGN PATENT DOCUMENTS

| | | |
|---|---|---|
| 1032363 | 6/1966 | United Kingdom. |
| 1278421 | 6/1972 | United Kingdom. |

OTHER PUBLICATIONS

Abraham: *Asphalts and Allied Substances*, 5th Edition, vol. 1, Raw Materials and Manufactured Products, D. Van Nostrand Co, Inc., New York (1945), pp.552–554 & 558–564.

*Primary Examiner*—Richard D. Lovering
*Attorney, Agent, or Firm*—Daniel B. Reece, IV; Terry B. McDaniel; Richard L. Schmalz

[57] ABSTRACT

This invention relates to the manufacture and application of uniquely suitable emulsifiers for anionic bituminous emulsions. In particular, this invention relates to emulsifiers for slow-setting aqueous emulsions suitable for use in applications where a high degree of chemical, mechanical, and rheological stability is required (such as in slurry seal applications and thixotropic industrial emulsion applications). In such applications, fine aggregate, clay, or polymer latex is mixed with the emulsion to obtain a homogenous storage-stable composite which can be applied for coatings, floorings, roofings, and as a roadway sealant.

9 Claims, No Drawings

SLOW-SETTING BITUMINOUS EMULSIONS

FIELD OF INVENTION

This invention relates to the manufacture and application of uniquely suitable emulsifiers for anionic bituminous emulsions. In particular, this invention relates to emulsifiers for slow-setting aqueous emulsions suitable for use in applications where a high degree of chemical, mechanical, and rheological stability is required (such as in slurry seal applications and thixotropic industrial emulsion applications). In such applications, fine aggregate, clay, or polymer latex is mixed with the emulsion to obtain a homogenous storage-stable composite which can be applied for coatings, floorings, roofings, and as a roadway sealant.

BACKGROUND OF THE INVENTION

VINSOL® (commercially available from Hercules, Inc.) is a high-molecular weight product consisting primarily of a phenolic fraction (57%), a hydrocarbon fraction (15%), and a rosin-based fraction (28%). Each fraction is a combination of a variety of chemical substances. Emulsion formulators commonly use VINSOL as an anionic emulsifier in order to achieve desired mixing stabilities and drying characteristics for slow-setting asphalt emulsions. However, as VINSOL is obtained from tree stumps as a residue of wood rosin manufacturing processes, there exists some question as to whether the increasing commercial demand for this product will be met in the future.

Emulsions prepared with the sodium or potassium soap of VINSOL are, in most cases, of the slow-set type. That is, the emulsions are stable enough when mixed with Portland cement to conform with the specifications of A.S.T.M. D244 defining a slow-setting emulsion (which allows a maximum of one percent of coagulated emulsion to be retained on a No. 14 sieve). The results of the cement mixing test can vary with the amount of the emulsifier used, the pH of the soap solution, and the type of asphalt employed.

Tall oil fatty acids, tall oil rosins, gum and wood rosin, and other fatty carboxylic acids isolated from vegetable or animal oils or fats are common emulsifiers for anionic asphalt emulsions. However, the combination of fatty polycarboxylic acid emulsifiers with Portland cement invariably produces rapid-setting emulsions with minimum mixing stabilities. Likewise, when fatty polycarboxylic acid-based emulsion mixes are used with dense-graded fine aggregates or clay, the electrostatic charges between the aggregate particles cause the emulsions to break immediately upon contact. This renders such emulsions inadequate for slurry seal applications and thixotropic industrial emulsion applications which contain clay and/or polymer latex.

The use of high acidity asphalts also generally results in the formation of rapid or medium-setting emulsions having high cement mix residues. Formulators have traditionally used blends of VINSOL and INDULIN® C (a kraft lignin sodium salt commercially available from Westvaco, Inc.) with high acidity asphalts in order to obtain emulsions with slow-set characteristics.

In commonly assigned U.S. Pat. No. 4,676,927, Schilling et al. teach the production of rapid-setting and medium-setting aqueous bituminous emulsions. The patent teaches the employment of an anionic emulsifier at levels of between 0.4 to 0.6% for rapid-setting applications and between 0.6 to 3.0% for medium-setting applications. However, emulsions taught by the patent are to be unsuitable for use as storage-stable, slow-setting aqueous anionic bituminous emulsions, especially in applications where fine aggregates or clay is required.

Therefore, it is an object of this invention to produce an alternative to VINSOL for use in formulating anionic bituminous emulsions.

Another object of this invention is to formulate stable slow-setting anionic bituminous emulsions suitable for use with fine aggregates in slurry seal applications.

A further object of this invention is to formulate stable slow-setting anionic bituminous emulsions suitable for use with clays and/or polymer latices in industrial emulsion applications.

SUMMARY OF THE INVENTION

The object of this invention is met by first reacting a combination of from 55% to 85% by weight of unsaturated fatty acids or rosin-derived resin acids with 15% to 45% by weight of acrylic acid, methacrylic acid, fumaric acid, or maleic anhydride (with or without a catalytical amount of iodine) to produce a polycarboxylic acid or anhydride. Subsequently, from about 90.0% to 97.5% by weight of the polycarboxylic acid or anhydride is subsequently reacted with from about 2.5% to 10.0% of a suitable base to produce a soap. These soaps are excellent anionic emulsifiers when used to formulate slow-setting anionic bituminous emulsions. Such emulsions are suitable for use with fine aggregates in slurry seal applications, as well as with clays and/or polymer latices for industrial emulsion applications. These emulsions exhibit excellent stabilities and can be stored for long periods of time until required for use.

Slow-setting anionic emulsifiers with enhanced performance properties can be produced by purifying the polycarboxylic acids or anhydrides via distillation or crystallization prior to reacting the polycarboxylic acids or anhydrides with a suitable base.

Further improvements in the stability of the emulsions can be produced via the addition of kraft lignin sodium salts and/or nonionic emulsifiers to the anionic emulsifier.

Significant improvements in the stabilities of these emulsions may be achieved via blending kraft lignin with the resin acids or tall oil fatty acids in a solvent (such as ethylene glycol, propylene glycol, and their higher homologues). The blend is subsequently reacted with maleic anhydride to produce a mixture of polycarboxylic acid ester, which is thereafter reacted with a suitable aqueous base to produce the enhanced slow-setting anionic emulsifier. This is a preferred method of practicing the present invention.

Further significant improvements in the stabilities of these emulsions may be achieved via first reacting a maleated resin and/or fatty acid with a member selected from the group consisting of: polyethylene glycols having a molecular weight greater than 500, ethoxylated nonylphenol, ethoxylated octylphenol, and ethoxylated fatty alcohols (wherein each member of the group has attached thereto a polyethylene ether chain consisting of from 10 to 100 ethylene ether units). Subsequently, the resulting reaction product is reacted with a fortified fatty acid and/or resin acid to produce a polycarboxylic acid or anhydride reaction product. Lastly, the polycarboxylic acid or anhydride reaction product is reacted with a suitable base to produce an anionic emulsifier. This is also a preferred method of practicing the present invention.

DESCRIPTION OF THE PREFERRED EMBODIMENT

The chemical structures of the reaction products obtained by reacting fatty acids or rosin-derived resin acids with acrylic acid, methacrylic acid, fumaric acid, and/or maleic anhydride depend up on whether catalytical amounts of iodine are used for the reaction. The reaction products are mixtures of $C_{16}$–$C_{22}$ monocarboxylic acids and $C_{18}$–$C_{24}$ tricarboxylic acids or anhydrides. In the case of polyunsaturated fatty acids, reaction products with two moles of anhydride per mole fatty acid are also being formed (as disclosed by Riedman et al. in U.S. Pat. No. 3,451,958). The reaction products of resin acids with fumaric acid or maleic anhydride are mixtures of $C_{20}$-polycyclic monocarboxylic acids and $C_{24}$-polycyclic tricarboxylic acids or anhydrides and smaller amounts of $C_{26}$-polycyclic pentacarboxylic dianhydrides. The pentacarboxylic acid derivatives and tricarboxylic acid derivatives are formed from mono or bis-unsaturated acids via "ene"-addition of maleic anhydride (or other reactants) to the carbon atom adjacent to the double bond of the resin acid. "Ene"-addition of oleic acids are shown in Formulae (I) and (II) below. These products are obtained without the addition of catalysts.

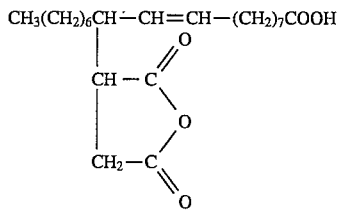

Formula I

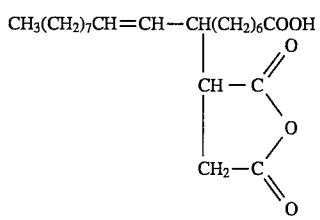

Formula II

Diels-Alder cycloaddition of maleic anhydride (as well as the addition of acrylic acid, methacrylic acid, and fumaric acid) onto conjugated double bonds of polyunsaturated acids yields the cyclohexene derivatives shown in Formulae III and IV below:

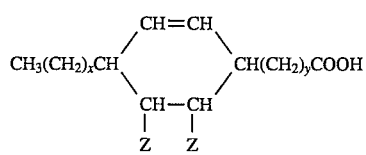

Formula III wherein x and y are integers from 3 to 9 and x and y together equal 12, at least one Z is a carboxylic acid group and any remaining Z is hydrogen. In the case of the anhydride, a five membered oxygen containing ring is attached to the cyclohexene structure:

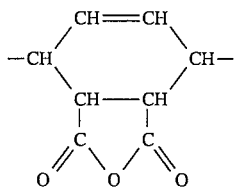

Formula IV

Acids and anhydrides of this type of are disclosed in U.S. Pat. Nos. 3,753,968 and 3,899,476 to Ward, U.S. Pat. No. 4,081,462 to Powers et al., British Patent No. 1,032,363 to Crawford, and U.S. Pat. No. 3,412,056 to Crawford.

Examples of the $C_{24}$-polycyclic tricarboxylic acid and anhydride are the reaction products of levopimaric acid with fumaric acid (i.e., fumaropimaric acid anhydride shown in Formula V below) and the product of levopimaric acid with maleic anhydride (i.e., maleopimaric acid anhydride shown in Formula VI below) as described in Kirk-Othmer, *Encyclopedia of Chemical Technology*, 3rd Edition, Vol. 20, Wiley-Interscience Publication, John Wiley & Sons, New York, 1978:

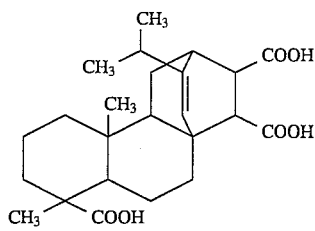

Formula V

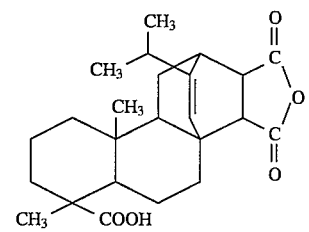

Formula VI

A polyhydric alcohol (such as ethylene glycol, diethylene glycol, or the corresponding propylene glycols) can be used as a solvent when lignin is reacted with small amounts of maleic anhydride or for the maleation of lignin/fatty acid or lignin/rosin blends. Here, the corresponding glycol esters of maleic acid are formed first. At high temperature, they undergo addition reaction to the lignin, to the unsaturated fatty acids, and to the rosin (as discussed above). The ester bonds are cleaved in a subsequent saponification step to yield the corresponding water soluble salts.

Sulfonated carboxylic acids may be used in the preparation of the invention emulsifier formulations. Suitable sulfonated carboxylic acids are derived by sulfonation of oleic acid or tall oil fatty acids of the following compositions:

TABLE I

|  | Oleic Acid | Tall Oil Fatty Acid |
|---|---|---|
| Palmitic Acid | 4.29 | 2.37–5.70 |
| Palmitoleic Acid | 11.00 | 1.03–1.80 |
| Oleic Acid | 72.00 | 43.12–47.13 |

TABLE I-continued

| | Oleic Acid | Tall Oil Fatty Acid |
|---|---|---|
| Elaidic Acid | 1 | 1–23.50 |
| Linoleic Acid | 4.11 | 3.20–33.11 |
| Conjugated Linoleic Acid | 1.4 | 5.30–9.10 |

The sulfonated products are characterized by an acid number from about 220 to 330 and a saponification number from about 300 to 360.

Sauls and Ruggenberg disclose the sulfonation of oleic acid with sulfur trioxide in liquid sulfur dioxide in U.S. Pat. No. 2,743,288.

Pugh and Chesworth disclosure in British Patent No. 1,278,421 the sulfonation of oleic acid with gaseous sulfur trioxide diluted with an inert gas with a continuously formed liquid film of the unsaturated fatty acid.

It is reported that upon sulfonation of oleic acid with sulfur trioxide, a mixture of 3.1:1.6:1 compounds (Formulae VII, VIII, and XI below) in 85% yield is obtained.

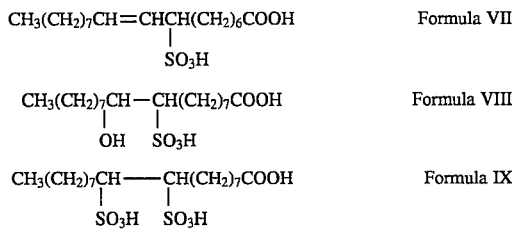

$$CH_3(CH_2)_7CH=CHCH(CH_2)_6COOH \quad \text{Formula VII}$$
$$\phantom{CH_3(CH_2)_7CH=CHC}|$$
$$\phantom{CH_3(CH_2)_7CH=CHCH}SO_3H$$

$$CH_3(CH_2)_7CH-CH(CH_2)_7COOH \quad \text{Formula VIII}$$
$$\phantom{CH_3(CH_2)_7C}|\phantom{H-}|$$
$$\phantom{CH_3(CH_2)_7CH}OH\ SO_3H$$

$$CH_3(CH_2)_7CH-\!-\!-CH(CH_2)_7COOH \quad \text{Formula IX}$$
$$\phantom{CH_3(CH_2)_7C}|\phantom{H---}|$$
$$\phantom{CH_3(CH_2)_7C}SO_3H\ SO_3H$$

The sulfonation of tall oil fatty is also disclosed in the above-mentioned patents. Reaction mechanisms and all aspects of sulfonation are reviewed in E. E. Gilbert, *Sulfonation and Related Reactions*, R. E. Krieger Publishing Company, Huntington, N.Y., 1977.

As noted above, the present invention relates to the preparation of slow-setting aqueous anionic bituminous emulsions suitable for use with fine aggregates in slurry seal applications. When slow-setting emulsions are employed for slurry seal applications the emulsion, water, fine aggregate, and, if desired, mineral additives (such as portland cement, hydrolyzed lime, and the like) are commonly mixed on a paving truck and continuously laid on top of the wearing course to be repaired.

The present invention also relates to the preparation of slow-setting aqueous anionic bituminous emulsions suitable for use with clay-containing and/or polymer latex-containing thixotropic industrial emulsions where a high degree of stability is desired. In these types of applications, clay and/or polymer latex is either co-emulsified with the asphalt; or an aqueous clay and/or polymer latex dispersion is mixed with the asphalt emulsion to obtain a homogenous storage-stable composite which can be applied for coatings, flooring, roofing, and as a roadway sealer. Polymer latices which are suitable for use in formulating the industrial emulsions include natural rubber latices, styrene-butadiene rubber latices, and the like.

The invention is practiced by reacting an unsaturated fatty acid and/or rosin-derived resin acids with either acrylic acid, methacrylic acid, fumaric acid, or maleic anhydride to produce a polycarboxylic acid or anhydride. The polycarboxylic acid or anhydride is subsequently reacted with a suitable base in water to produce the emulsifier (i.e. soap). The emulsifier is subsequently combined with aggregate, bitumen, and water to produce the desired slow-setting anionic bituminous emulsion.

Unsaturated fatty acids which are suitable for use in producing polycarboxylic acid and anhydrides include, but are not limited to, the following:

tall oil, soybean oil, tung oil, linseed oil, linoleic acid, linolenic acid, oleic acid, blends of $C_{10}$–$C_{22}$ unsaturated and saturated fatty acids, and combinations thereof.

Rosin-derived resin acids which are suitable for use in producing the present emulsions include, but are not limited to, the following:

tall oil resin, gum resin, wood resin, and combinations thereof.

Reactants which are suitable for the modification of the above-noted fatty acids and/or resin acids include, but are not limited to, the following:

acrylic acid, methacrylic acid, fumaric acid, maleic anhydride, and combinations thereof.

Polycarboxylic acid or anhydrides suitable for use in the invention are produced by reacting from 55% to 85% by weight of unsaturated fatty acids and/or rosin-derived resin acids with 15% to 45% by weight of a member selected from the group consisting of acrylic acid, methacrylic acid, fumaric acid, and maleic anhydride at temperatures ranging from about 180° to 230° C. for a period of about 2 to 10 hours. This reaction may be executed with and without the addition of catalytic amounts of iodine.

Anionic emulsifiers with enhanced performance properties may be produced by purifying the polycarboxylic acid or anhydride via distillation or crystallization prior to reacting the anhydride to produce the alkaline soap (anionic emulsifier).

Anionic emulsifiers (alkaline soaps) are obtained by reacting from about 2.5% to 10.0% by weight of a suitable base with from about 90.0% to 97.5% by weight of a polycarboxylic acid or anhydride. Suitable bases include, but are not limited to, the following:

ammonium hydroxide, potassium hydroxide, sodium hydroxide, ethanolamine, diethanolamine, triethanolamine, and combinations thereof.

To prepare the anionic bituminous emulsions of this invention, the aqueous soap solution of emulsifiers described above is intimately mixed with bitumen under high shear in a colloid mill. The standard procedure is to first preheat both the soap solution (to about 55° C.) and the fluid asphalt (to about 120°–125° C.). The preheated soap solution and fluid asphalt are subsequently mixed under high shear in a colloid mill for about 30 seconds to yield asphalt emulsions of brown color and creamy texture. If desired, the emulsions may be stored at 70° C. for 16 hours prior to testing according to the procedure detailed in A.S.T.M. D-244.

The emulsions have a pH in the range of greater than 7.0 to 12.5, and an asphalt residue in the range of about 50 to 70%.

The amount and type of the emulsifier necessary to obtain the desired slow-setting emulsions depends upon the type of fine aggregate, clay, polymer latex, and bitumen utilized. Emulsifier concentrations of above 3.5 to 10.0% (based on the weight of the emulsion) are suitable for use in making slow-setting emulsions with desired load bearing characteristics and mixing performance.

The bitumen content of the anionic bituminous emulsion can range from about 30% to 80% by weight, preferably between 60% and 70%. The "bitumen" used in the emulsion may be derived from domestic or foreign crude oil. Suitable bitumen types include, but are not limited to, the following: bitumen, natural asphalt, petroleum oil, oil residue of paving grade, plastic residue from coal tar distillation, petroleum pitch, asphalt cements, and cutback asphalts (i.e., asphalt diluted with hydrocarbon solvents such as kerosene or diesel oil). Indeed, practically any viscosity or penetration graded asphalt cement for use in pavement construction as described in A.S.T.M. designation D-3381 and D-946 may be emulsified with the aid of the emulsifiers of this invention.

The above-described emulsifiers perform very satisfactorily without the use of auxiliary emulsifiers or dispersants. However, a skilled artisan may occasionally desire to alter the performance of the emulsion to obtain improved viscosity at a given asphalt content or improved storage stability.

Further improvements in the stability of the emulsions can be produced by adding auxiliary emulsifiers such as lignin sodium salts and/or nonionic emulsifiers to the emulsions. Lignins isolated from sulfite or kraft pulping processes are suitable for use in the above-noted blend; as are nonionic emulsifiers such as ethoxylated alkylphenols and ethoxylated fatty alcohols.

It is preferred to further improve emulsion stability by first reacting from 15.0% to 45.0% by weight of maleic anhydride with a blend containing from 25.0% to 45.0% by weight of kraft lignin and from 10.0% to 60.0% by weight of a member selected from the group consisting of unsaturated fatty acids, rosin-derived resin acids, and mixtures thereof, to produce esters of polycarboxylic acids or anhydrides. (The kraft lignin and fatty acids and/or resin acids are blended in a solvent selected from the group consisting of ethylene glycol, propylene glycol, and their higher homologues.) From 90.0% to 97.5% by weight of the ester reaction products are subsequently reacted with from 2.5% to 10.0% by weight of a suitable base to produce the enhanced slow-setting anionic emulsifiers. Preferred slow-set aqueous bituminous emulsions having enhanced emulsion stabilities may be formulated by combining bitumen, water, and from about 3.5% to about 10.0%, (based on the weight of the emulsion) of an alkaline solution of the enhanced anionic emulsifier.

Another preferred embodiment having enhanced emulsion stability may be produced by first reacting: (a) 1.0 part by molecular weight of a member selected from the group consisting of maleated tall oil fatty acid, maleated tall oil resin acid, and combinations thereof, with (b) 0.5 to 1.0 part by molecular weight of a member selected from the group consisting of polyethylene glycols having a molecular weight greater than 500, ethoxylated nonylphenol, ethoxylated octylphenol, and ethoxylated fatty alcohols (wherein each member of the "b" group has attached thereto a polyethylene ether chain consisting of from 10 to 100 ethylene ether units). Subsequently, from about 50.0% to 90.0% by weight of the resulting reaction product is reacted with from 10.0% to 50.0% by weight of a fortified fatty acid and/or resin acid to produce a polycarboxylic acid or anhydride reaction product. The fortified fatty acid and/or resin acid is produced by reacting: (a) 55.0% to 85.0% by weight of a member selected from the group consisting of unsaturated fatty acids, rosin-derived resin acids, and mixtures thereof, and (b) 15.0% to 45.0% by weight of a member selected from the group consisting of acrylic acid, methacrylic acid, fumaric acid, maleic anhydride, and mixtures thereof. Lastly, from 90.0% to 97.5% by weight of the polycarboxylic acid or anhydride reaction product is reacted with from 2.5% to 10.0% by weight of a suitable base to produce a preferred anionic emulsifier.

Sulfonate groups and dispersants may also be employed to further improve the stability of slow-set aqueous bituminous emulsions. Sulfonate groups and dispersants which are suitable for use with the anionic bituminous emulsions formulations include, but are not limited to, the following:

dodecyl benzene sulfonates,

α-olefin sulfonates, alkyl ether sulfonates, long-chain ethyl sulfonates, petroleum sulfonates, alkyl naphthalene sulfonates, naphthalene sulfonic acid-formaldehyde condensates, N-methyl taurides, and dodecyl phenyl ether disulfonates (e.g., DOWFAX®, which is commercially available from Dow Chemicals, Inc.).

The practice of this invention may be seen in the following examples wherein the preparation of emulsions with various types of emulsifier formulations is depicted. These examples are provided to further illustrate the present invention and are not to be construed as limiting the invention in any manner.

EXAMPLE 1

This example shows the typical preparation of an anionic bituminous emulsifier.

To 280–300 grams of tall oil fatty acid or rosin 50–140 grams maleic anhydride is added and heated at 200°–230° C. for 2 to 10 hours. Excess maleic anhydride is removed by nitrogen or steam sparging. Unreacted fatty acid is removed from the reaction products by vacuum distillation. After cooling, the crude reaction product or the purified acid or anhydride is suspended in water and adjusted with potassium or sodium hydroxide to pH 7–12.

EXAMPLE 2

This example illustrates the preparation of preferred emulsions via reacting blends of lignin and tall oil fatty acid or lignin and rosin with maleic anhydride in ethylene glycol or diethylene glycol.

A. Seventy-five to eighty parts tall oil rosin were dissolved in 100 parts diethylene glycol at 100° C. To the homogenous solution, 15 to 25 parts of INDULIN® A (a kraft lignin commercially available from Westvaco, Inc.) were added and heated at 120° C. until dissolved. Then 50 parts maleic anhydride were added and heated at 200°–210° C. for 2 to 4 hours. Water formed by esterification of maleic anhydride was collected in a Dean-Stark trap. After cooling to 150° C., the reaction product was saponified with dilute sodium hydroxide or potassium hydroxide. Final activity of the emulsifier solution was 30–40%.

B. Fifty parts of INDULIN® A were dissolved in 100 parts diethylene glycol and heated to 120° C. To the homogeneous solution, 50 parts L-5 (a tall oil fatty acid commercially available from Westvaco, Inc.) and 50 parts maleic anhydride were added. The temperature was raised to 200°–220° C. and kept there for 4 to 6 hours. After cooling to 150° C., the reaction product was saponified as described under A.

EXAMPLE 3

In this example, several emulsifiers were produced via the methods outlined in Examples 1 and 2 above. (The formulations of the emulsifiers are listed in Table II below.) These emulsifiers were used to produce emulsions from Texaco AC-5 asphalt at 63% asphalt residue using 4.25% emulsifier at pH 11.5. Table II shows the results of the cement mix test (A.S.T.M. D-244) and aggregate mixing behavior with Type II slurry seal (granite) aggregate.

TABLE II

| Emulsifier[a] | Cement Mix Residue (grams) | Aggregate Mixing[b] |
|---|---|---|
| 100 L-5/35 MA | 45.30 | broke |
| 100-L-5/50 MA | 33.00 | broke |
| 50-L-5/50 Rosin/50 MA | 20.40 | broke |
| 50-L-5/50 Lignin/50 MA | 6.20 | mixed |
| 100 Rosin/20 MA | 61.60 | broke |
| 100 Rosin/30 MA | 7.10 | mixed |
| 100 Rosin/40 MA | 4.80 | mixed |
| 100 Rosin/50 MA | 1.50 | mixed |
| 85 Rosin/15 Lignin/50 MA | 2.50 | mixed |
| 75 Rosin/25 Lignin/50 MA | 2.10 | mixed |
| 100 L-5/28 MA/210 SURFONIC N-300 | 0.30 | mixed |
| 100 L-5/28 MA/420 SURFONIC N-300 | 0.10 | mixed |
| 100 Rosin/30 MA/43 NP-55 | 0.80 | mixed |
| 100 Rosin/30 MA/65 NP-55 | 0.50 | mixed |
| 100 Rosin/30 MA/30 CARBOWAX 1000 | 0.07 | mixed |
| 100 Rosin/30 MA/43 SURFONIC N-150 | 2.10 | mixed |

[a]L-5: tall oil fatty acid commercially available from Westvaco, Inc.
MA: maleic anhydride.
SURFONIC N-150: nonylphenol ethoxylate commercially available from Texaco, Inc. (15 moles ethylene oxide).
SURFONIC N-300: nonylphenol ethoxylate commercially available from Texaco, Inc. (30 moles ethylene oxide).
NP-55: nonylphenol ethoxylate commercially available from Texaco, Inc. (55 moles ethylene oxide).
CARBOWAX 1000: a polyethylene glycol commercially available from Union Carbide, Inc.
[b]A minimum mixing time of 30 seconds is required.

This example shows that emulsions produced with maleated tall oil fatty soaps are more sensitive to cement and fine-graded aggregate than emulsions produced with maleated rosin soaps. Lignins used as the co-reactant improves the slow-set performance of the emulsifiers as well as the post-esterification of the maleated rosin or tall oil fatty acid with polyethylene derivatives.

EXAMPLE 4

This example illustrates the storage stability of seal coat formulations containing clay, cellulose fibers, ground slate, and the mixing stability with fine-graded slurry seal aggregate (Type II, granite screenings).

A number of emulsifiers were produced via the methods outlined in Examples 1 and 2 above. (The formulations of the emulsifiers are listed in Table III below.) These emulsifiers were used to produce emulsions from Shell Extra Hard Asphalt (AR 4000) was at 63% asphalt residue. Emulsions were prepared at pH 11.5 using 4% emulsifier.

TABLE III

| Emulsifier[a] | % Dosage | Cement Mix Residue (g) | ml Supernatant after 30 days | Aggregate Mixing |
|---|---|---|---|---|
| VINSOL/INDULIN SAL | 3/1 | 0.50 | 7.0 | good |
| 100 L-5/53 MA | 4 | 100.00 | gelled | broke |
| 100 L-5/53 MA/INDULIN SAL | 3/1 | 4.90 | 3.8 | good |
| 100 L-5/53 MA/INDULIN SAL | 2/2 | 0.54 | 7.4 | good |
| 100 L-5/53 MA/INDULIN SAL | 1/3 | 0.55 | 16.2 | good |
| TENAX ® 2010/INDULIN SAL | 3/1 | 0.90 | 5.4 | good |
| TENAX ® 2010/INDULIN SAL | 2/2 | 0.70 | 15.6 | good |
| TENAX ® 2010/INDULIN SAL | 1/3 | 0.06 | 17.0 | good |
| 100 L-5/15 FuA/INDULIN SAL | 1/3 | 12.40 | 12.6 | good |
| DIACID 1550/INDULIN SAL | 1/3 | 12.80 | 12.8 | good |
| 100 Rosin/50 MA | 4 | 3.70 | 0.0 | good |
| 100 Rosin/50 MA/INDULIN SAL | 3/1 | 6.50 | 0.0 | good |
| 100 Rosin/50 MA/INDULIN C | 3/1 | 5.10 | 0.0 | good |
| 100 M28B/50 MA/INDULIN SAL | 3/1 | 17.60 | 0.2 | good |
| 100 L-5/40 MA/INDULIN SAL | 3/1 | 13.10 | 2.8 | good |
| 50 L-5/50 Rosin/50 MA/INDULIN SAL | 3/1 | 8.20 | 0.0 | good |
| 75 L-5/25 Lignin/50 MA/INDULIN SAL | 3/1 | 24.10 | 11.8 | broke |
| 75 Rosin/25 Lignin/50 MA/INDULIN SAL | 3/1 | 7.40 | 6.4 | good |
| INDULIN SAL | 4 | 2.00 | 19.0 | good |

[a] L-5: tall oil fatty acids commercially available Westvaco, Inc.
M28B: distilled tall oil containing 30% rosin commercially available from Westvaco, Inc.
MA: maleic anhydride.
INDULIN ® SAL: slow-set emulsifier based on kraft lignin commercially available from Westvaco, Inc.
TENAX ® 2010: Commercial anhydride based on tall oil commercially available from Westvaco, Inc.
FuA: fumaric acid
DIACID 1550 ®: $C_{21}$-dicarboxylic acid based on tall oil commercially available from Westvaco, Inc.
INDULIN ® C: kraft lignin sodium salt commercially available from Westvaco, Inc.

This example shows that combinations of highly maleated tall oil fatty acids and highly maleated rosin when combined with small amounts of INDULIN SAL yield emulsions with good aggregate mixing stability and good suspension power for inert materials. Increasing amounts of INDULIN SAL in the emulsifier formulations decrease the suspension power of the emulsions.

EXAMPLE 5

This example shows a variety of emulsifier formulations used for different kinds of asphalts. Several emulsifiers were produced via the methods outlined in Examples 1 and 2 above. (The formulations of the emulsifiers are listed in Table IV below.) These emulsifiers were used to produce emulsions from a variety of asphalts.

TABLE IV

| Emulsifier[a] | % Dosage | pH-value | Cement mix Residue (g) | Asphalt |
|---|---|---|---|---|
| Maleated Rosin (MR) | 3.75 | 11.5 | 17.1 | Texaco AC-5 |
| MR/INDULIN C | 4/1 | 11.5 | 4.5 | Texaco AC-5 |
| MR/INDULIN C | 3/2 | 11.5 | 3.0 | Texaco AC-5 |
| MR/INDULIN C | 3/1 | 11.5 | 0.2 | Texaco AC-5 |
| MR/INDULIN SAL | | | | |
| MR/NP-55 | 4/1 | 11.5 | 1.1 | Texaco AC-5 |
| MR/SULFOTEX AOS | 4/1 | 11.5 | 29.1 | Texaco AC-5 |
| MR/INDULIN MQK-1M | 4/1 | 11.5 | 19.2 | Texaco AC-5 |
| Maleated Rosin (MR) | 3.75 | 11.5 | 4.7 | Marathon AC-30 |
| Maleated Rosin (MR) | 3.75 | 11.5 | 18.7 | Ergon AC-30 |
| Maleated Rosin (MR) | 3.75 | 11.5 | 42.9 | Amoco EB-20 |
| Maleated Rosin (MR) | 3.75 | 11.5 | 1.5 | Shell AR-4000 |
| MR/INDULIN C | 3.6/1.5 | 11.0 | 26.0 | Oxnard AC-20 |
| MR/INDULIN C | 3.6/1.5 | 10.0 | 15.1 | Oxnard AC-20 |
| MR/INDULIN C | 3.6/1.5 | 9.5 | 9.7 | Oxnard AC-20 |
| MR/INDULIN C | 3.6/1.5 | 8.5 | 5.6 | Oxnard AC-20 |
| MR/NP-55 | 4.8/0.8 | 9.5 | 0.1 | Oxnard AC-20 |

[a] INDULIN ® C: kraft lignin sodium salt commercially available from Westvaco, Inc.
INDULIN ® SAL: slow-set emulsifier based on lignin commercially available from Westvaco, Inc.
SULFOTEX ® AOS: α-olefine sulfonate commercially available from Henckel, Inc.
NP-55: nonylphenol ethoxylate commercially available from Texaco, Inc. (55 moles ethylene oxide);
INDULIN ® MQK-1M: tall oil-based amido amine commercially available from Westvaco, Inc.

This example shows the influence of the type of asphalt on the cement mix results. It also shows, that by either lowering the emulsion pH value, or by using kraft lignins or nonionic surfactants as co-emulsifiers, the emulsion can be rendered slow-set; thereby meeting the A.S.T.M. D-244 cement mix specification of less than 2 grams of sieve residue.

EXAMPLE 6

This example illustrates the properties of slurry seal formulations. Following the methods outlined in Examples 1 and 2 above, emulsions were prepared with Sinclair AC-40 asphalt at 63% asphalt residue and pH 11.5 to 12.5. Cohesive strength development, dimensional stability, and integrity were evaluated according to the "Guidelines of the International Slurry Surfacing Association." No polymer latex was used to produce the emulsions. Type II aggregate (granite) was used for the formulations.

TABLE V

Cohesion Test Results

| Emulsifier[a] | % Dosage | pH value | Formulation[b] | Cohesive Strength (kg/cm) After | | | |
|---|---|---|---|---|---|---|---|
| | | | | 30 | 60 | 90 | 120 min |
| Maleated | 4.25 | 11.5 | 14W 11E | 8.5 | 8.7 | 10.2 | 11.0 |
| Rosin (MA) | | | 1G 14W 11E | 7.5 | 9.6 | 10.1 | 10.2 |
| | | | 1C 14W 11E | 8.2 | 8.9 | 10.2 | 11.3 |
| MA/INDULIN | 1.75/4.5 | 12.5 | 14W 11E | 13.6IC | 13.3I | 18.2I | 15.3I |
| MQK-1M | | | 1G 14W 11E | 17.3IC | 15.6I | 15.9I | 15.9I |
| | | | 1C 14W 11E | 10.6 | 13.3 | 15.0 | 16.8I |

[a]INDULIN MQK-1M: tall oil derived amido amine commercially available from Westvaco, Inc.
[b]W: water.
E: emulsion.
C: cement.
G: gypsum, parts per 100 parts aggregate.
I: test specimen stayed intact, indicating sufficient strength to support rolling traffic.
IC: intact with small crack.
Curing temperature was 75° C.

TABLE VI

Loaded Wheel Test Results
Emulsifier: Maleated Rosin/INDULIN MQK-1M
(0.35/0.9%/pH 12.5)

| Formulation[a] | Temp (°F.) | % Distortion | | Track Depth (mm) |
|---|---|---|---|---|
| | | Lateral | Vertical | |
| 14W 11E | 75 | 8.55 | 20.64 | 2.76 |
| 1G 14W 11E | 75 | 7.05 | 19.34 | 2.50 |
| 1C 14W 11E | 75 | 12.41 | 23.76 | 3.16 |

[a]INDULIN MQK-1M: tall oil derived amido amine commercially available from Westvaco, Inc.

TABLE VII

Integrity Test Results
Emulsifier: Maleated Rosin/INDULIN MQK-1M
(1.75/4.5%, pH 12.5)

| Formulation[a] | % Absorption | % Abrasion | % Integrity |
|---|---|---|---|
| 17W 11E | 1.67 | 3.62 | 99.2 |
| 1G 17W 11E | 1.48 | 2.96 | 96.2 |
| 1C 17W 11E | 1.64 | 3.54 | 90.8 |

[a]INDULIN MQK-1M: tall oil-derived amido amine commercially available from Westvaco, Inc.

This example shows the usefulness of this type of product for slurry seal emulsions. Generally, it takes 3 to 4 hours until the slurry mat is strong enough to support traffic. Combinations with INDULIN MQK-1M produce emulsions with quick-traffic characteristics. The cohesive strength development, dimensional stability and integrity of slurry seal prepared with this emulsion is comparable to the results of micro seal obtained with polymer-modified cationic microsurfacing emulsions using the same aggregate.

EXAMPLE 7

This example shows the versatility of a maleated rosin (MR) emulsifier in producing viscous clay-containing asphalt emulsions. Table VIII shows the effect of the clay loading and asphalt content on the viscosity of the emulsions. It also shows the compatibility with polymeric latices used to improve adhesion and flexibility of the dried films.

TABLE VIII

Clay-containing asphalt emulsions.

| Emulsion # | % Emulsifier dosage[a] | % Clay[b] | % Polymer | % Asphalt | Brookfield Vuscosity[c] |
|---|---|---|---|---|---|
| 1 | 4.5 | — | — | 60 | 350 |
| 2 | 4.5 | 1.0 | 3.0[d] | 60 | 3000 |
| 3 | 4.5 | 1.0 | 5.0[e] | 60 | 5400 |
| 4 | 4.5 | 1.0 | — | 60 | 2300 |
| 5 | 4.5 | 1.5 | — | 50 | 1400 |
| 6 | 4.5 | 2.0 | — | 40 | 1300 |

[a]The emulsions were prepared at pH 11.5; the swollen clay and the polymer latex were added to the emulsifier solution.
[b]Bentonite was used.
[c]Texaco AC-5 asphalt was used for all experiments.
[d]Highly ammoniated natural rubber latex (commercially available from Guthrie, Inc.).
[e]Anionic styrene butadiene rubber-latex (Butanol NS-120, commercially available from BASF, Inc.).

Further improvement in viscosities can be achieved when small amounts of thickening agents such as carboxymethyl cellulose, guar gum, xanthan gum or casein are added to the emulsifier solution prior to the emulsification of the asphalt.

While this invention has been described and illustrated herein by reference to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A slow-set aqueous bituminous emulsion comprising bitumen, water, and from about 3.5% to about 10.0%, based on the weight of the emulsion, of an alkaline solution of an anionic emulsifier, wherein said anionic emulsifier is the reaction product of:

(A) 2.5% to 10.0% by weight of a base, and
(B) 90.0% to 97.5% by weight of polycarboxylic acid or anhydride reaction product of
  (1) a blend of from 10.0% to 60.0% by weight of a member selected from the group consisting of unsaturated fatty acids, rosin-derived resin acids, and mixtures thereof, blended in a solvent with from 25.0% to 45.0% by weight of kraft lignin, and
  (2) 15.0% to 45.0% by weight of maleic anhydride.

2. The slow-set aqueous bituminous emulsion of claim 1 wherein said base is a member selected from the group consisting of: ammonium hydroxide, potassium hydroxide, sodium hydroxide, and combinations thereof.

3. The slow-set aqueous bituminous emulsion of claim 1 wherein said unsaturated fatty acid is a member selected from the group consisting of: tall oil, soybean oil, tung oil, linseed oil, linoleic acid, linolenic acid, oleic acid, blends of $C_{10}$–$C_{22}$ unsaturated and saturated fatty acids, and combinations thereof.

4. The slow-set aqueous bituminous emulsion of claim 1 wherein said rosin-derived resin acid is a member selected from the group consisting of: tall oil resin, wood resin, and combinations thereof.

5. The slow-set aqueous bituminous emulsion of claim 1 wherein said solvent is a member selected from the group consisting of: ethylene glycol, propylene glycol, and their higher homologues.

6. A slurry seal formulation comprising the slow-set aqueous bituminous emulsion of claim 1 mixed with fine aggregate.

7. An industrial emulsion formulation comprising the slow-set aqueous bituminous emulsion of claim 1 mixed with a member selected from the group consisting of: clay, natural rubber latices, styrene-butadiene rubber latices, and combinations thereof.

8. A slow-set aqueous bituminous emulsion comprising bitumen, water, and from about 3.5% to about 10.0%, based on the weight of the emulsion, of an alkaline solution of an anionic emulsifier, wherein said anionic emulsifier is the reaction product of:
(A) 2.5% to 10.0% by weight of a base, and
(B) 90.0% to 97.5% by weight of polycarboxylic acid or anhydride reaction product of
  (1) 10.0% to 50.0% by weight of the reaction product of
    (a) 55.0% to 85.0% by weight of a member selected from the group consisting of unsaturated fatty acids, rosin-derived resin acids, and mixtures thereof, and
    (b) 15.0% to 45.0% by weight of a member selected from the group consisting of acrylic acid, methacrylic acid, fumaric acid, maleic anhydride, and mixtures thereof; and
  (2) 50.0% to 90.0% by weight of reaction product of
    (a) 1.0 part by molecular weight of a member selected from the group consisting of: maleated tall oil fatty acid, maleated tall oil rosin acid, and combinations thereof, and
    (b) 0.5 to 1.0 part by molecular weight of a member selected from the group consisting of: polyethylene glycols having a molecular weight greater than 500, ethoxylated nonylphenol, ethoxylated octylphenol, and ethoxylated fatty alcohols; wherein each member of the group contains a polyethylene ether chain consisting of from 10 to 100 ethylene ether units.

9. A slow-set aqueous bituminous emulsion comprising (A) bitumen, (B) water, (C) from about 3.5% to about 10.0%, based on the weight of the emulsion, of an alkaline solution of an anionic emulsifier, wherein said anionic emulsifier is the reaction product of:
(a) 2.5% to 10.0% by weight of a base, and
(b) 90.0% to 97.5% by weight of polycarboxylic acid or anhydride reaction product of
  (1) a blend of from 10.0% to 60.0% by weight of a member selected from the group consisting of unsaturated fatty acids, rosin-derived resin acids, and mixtures thereof, blended in a solvent with from 25.0% to 45.0% by weight of kraft lignin, and
  (2) 15.0% to 45.0% by weight of maleic anhydride; and
(D) a member selected from the group consisting of: kraft lignin sodium salts, sulfite lignin sodium salts, ethoxylated alkylphenols, ethoxylated fatty alcohols, dodecyl benzene sulfonates, α-olefin sulfonates, alkyl ether sulfonates, long-chain ethyl sulfonates, petroleum sulfonates, alkyl naphthalene sulfonates, naphthalene sulfonic acid-formaldehyde condensates, N-methyl taurides, and dodecyl phenyl ether disulfonates.

* * * * *